(12) United States Patent
Cheng et al.

(10) Patent No.: US 11,576,122 B1
(45) Date of Patent: Feb. 7, 2023

(54) SIDELINK DISCONTINUOUS RECEPTION (DRX) SUPPORT INDICATION AND DETECTION

(71) Applicant: QUALCOMM Incorporated, San Diego, CA (US)

(72) Inventors: Hong Cheng, Basking Ridge, NJ (US); Junyi Li, Fairless Hills, PA (US); Qing Li, Princeton Junction, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/659,450

(22) Filed: Apr. 15, 2022

Related U.S. Application Data

(60) Provisional application No. 63/203,951, filed on Aug. 5, 2021.

(51) Int. Cl.
*H04W 52/02* (2009.01)
*H04W 92/18* (2009.01)

(52) U.S. Cl.
CPC ........ *H04W 52/0216* (2013.01); *H04W 92/18* (2013.01)

(58) Field of Classification Search
CPC ......... H04W 52/0212; H04W 52/0216; H04W 92/18
See application file for complete search history.

(56) References Cited

U.S. PATENT DOCUMENTS

2021/0227604 A1  7/2021  Huang et al.

FOREIGN PATENT DOCUMENTS

| EP | 3998784 A1 | 5/2022 |
|---|---|---|
| WO | 2021119474 A1 | 6/2021 |
| WO | 2021141408 A1 | 7/2021 |
| WO | 2021147856 A1 | 7/2021 |
| WO | WO-2021219212 A1 * | 11/2021 |
| WO | WO-2022013699 A2 * | 1/2022 |
| WO | WO-2022065927 A1 * | 3/2022 |

OTHER PUBLICATIONS

International Search Report and Written Opinion—PCT/US2022/072646—ISA/EPO—dated Sep. 2, 2022.

(Continued)

*Primary Examiner* — Thomas R Cairns
(74) *Attorney, Agent, or Firm* — Harrity & Harrity, LLP

(57) ABSTRACT

Various aspects of the present disclosure generally relate to wireless communication. In some aspects, a user equipment (UE) may receive one of a transmission profile, of an application executing on the UE, that indicates whether sidelink discontinuous reception (DRX) is required, or a sidelink communication that indicates whether sidelink DRX is supported. The UE may communicate with one or more other UEs in accordance with a configuration for sidelink DRX, or with sidelink DRX disabled, based at least in part on the transmission profile or the sidelink communication. Numerous other aspects are described.

30 Claims, 9 Drawing Sheets

(56) References Cited

OTHER PUBLICATIONS

OPPO: "Discussion on DRX Configuration and DRX Timers", 3GPP Draft, R2-2104835, 3rd Generation Partnership Project (3GPP), Mobile Competence Centre, 650, Route Des Lucioles, F-06921 Sophia-Antipolis Cedex, France, vol. RAN WG2, No. E-meeting, May 1, 2021, May 11, 2021 (May 11, 2021), XP052006585, 17 Pages, Sections 1-5.

SHARP: "Summary of [POST114-E] [704] [V2X/SL] Howto Make SureRei-16 UEs Not Supporting SL DRX are not involved in SL Communication in DRX Manner (Sharp)", 3GPP TSG-RAN WG2 Meeting #115 electronic, R2-2107303, 3rd Generation Partnership Project (3GPP), Mobile Competence Centre, 650, Route Des Lucioles, F-06921 Sophia-Antipolis Cedex, France, vol. RAN WG2, No. Online, Aug. 16-27, 2021, Aug. 5, 2021, XP052034029, pp. 1-51, Sections 1-3.

* cited by examiner

SIDELINK DISCONTINUOUS RECEPTION (DRX) SUPPORT INDICATION AND DETECTION

CROSS-REFERENCE TO RELATED APPLICATION

This Patent application claims priority to U.S. Provisional Patent Application No. 63/203,951, filed on Aug. 5, 2021, entitled "SIDELINK DISCONTINUOUS RECEPTION (DRX) SUPPORT INDICATION AND DETECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink discontinuous reception (DRX) support indication and detection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving one of a transmission profile, of an application executing on the UE, that indicates whether sidelink discontinuous reception (DRX) is required, or a sidelink communication that indicates whether sidelink DRX is supported. The method may include communicating with one or more other UEs in accordance with a configuration for sidelink DRX, or with sidelink DRX disabled, based at least in part on the transmission profile or the sidelink communication.

Some aspects described herein relate to an apparatus for wireless communication at a UE. The apparatus may include a memory and one or more processors coupled to the memory. The one or more processors may be configured to receive one of a transmission profile, of an application that is to execute on the UE, that indicates whether sidelink DRX is required, or a sidelink communication that indicates whether sidelink DRX is supported. The one or more processors may be configured to communicate with one or more other UEs in accordance with a configuration for sidelink DRX, or with sidelink DRX disabled, based at least in part on the transmission profile or the sidelink communication.

Some aspects described herein relate to a non-transitory computer-readable medium that stores a set of instructions for wireless communication by a UE. The set of instructions, when executed by one or more processors of the UE, may cause the UE to receive one of a transmission profile, of an application that is to execute on the UE, that indicates whether sidelink DRX is required, or a sidelink communication that indicates whether sidelink DRX is supported. The set of instructions, when executed by one or more processors of the UE, may cause the UE to communicate with one or more other UEs in accordance with a configuration for sidelink DRX, or with sidelink DRX disabled, based at least in part on the transmission profile or the sidelink communication.

Some aspects described herein relate to an apparatus for wireless communication. The apparatus may include means for receiving one of a transmission profile, of an application that is to execute on the apparatus, that indicates whether sidelink DRX is required, or a sidelink communication that indicates whether sidelink DRX is supported. The apparatus may include means for communicating with one or more UEs in accordance with a configuration for sidelink DRX, or with sidelink DRX disabled, based at least in part on the transmission profile or the sidelink communication.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
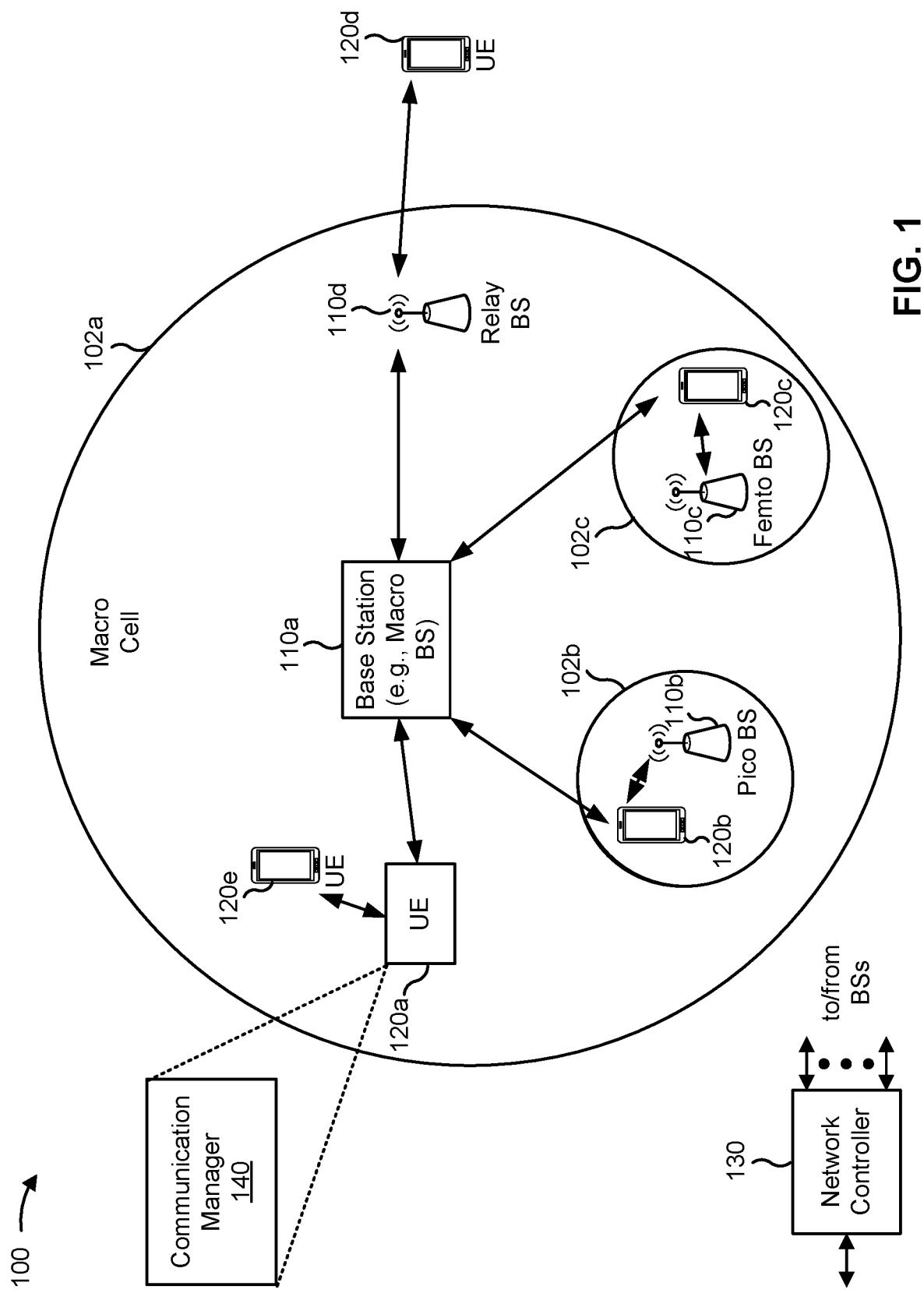
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) radio access network (RAN) Intelligent Controller (MC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some aspects, the UE 120 may include a communication manager 140. As described in more detail elsewhere herein, the communication manager 140 may receive a transmission profile, of an application executing on the UE 120, that indicates whether sidelink discontinuous reception (DRX) is required, or a sidelink communication that indicates whether sidelink DRX is supported; and communicate with one or more other UEs in accordance with a configuration for sidelink DRX, or with sidelink DRX disabled, based at least in part on the transmission profile or the sidelink communication. Additionally, or alternatively, the communication manager 140 may perform one or more other operations described herein.

As indicated above, FIG. 1 is provided as an example. Other examples may differ from what is described with regard to FIG. 1.

Figure 2:
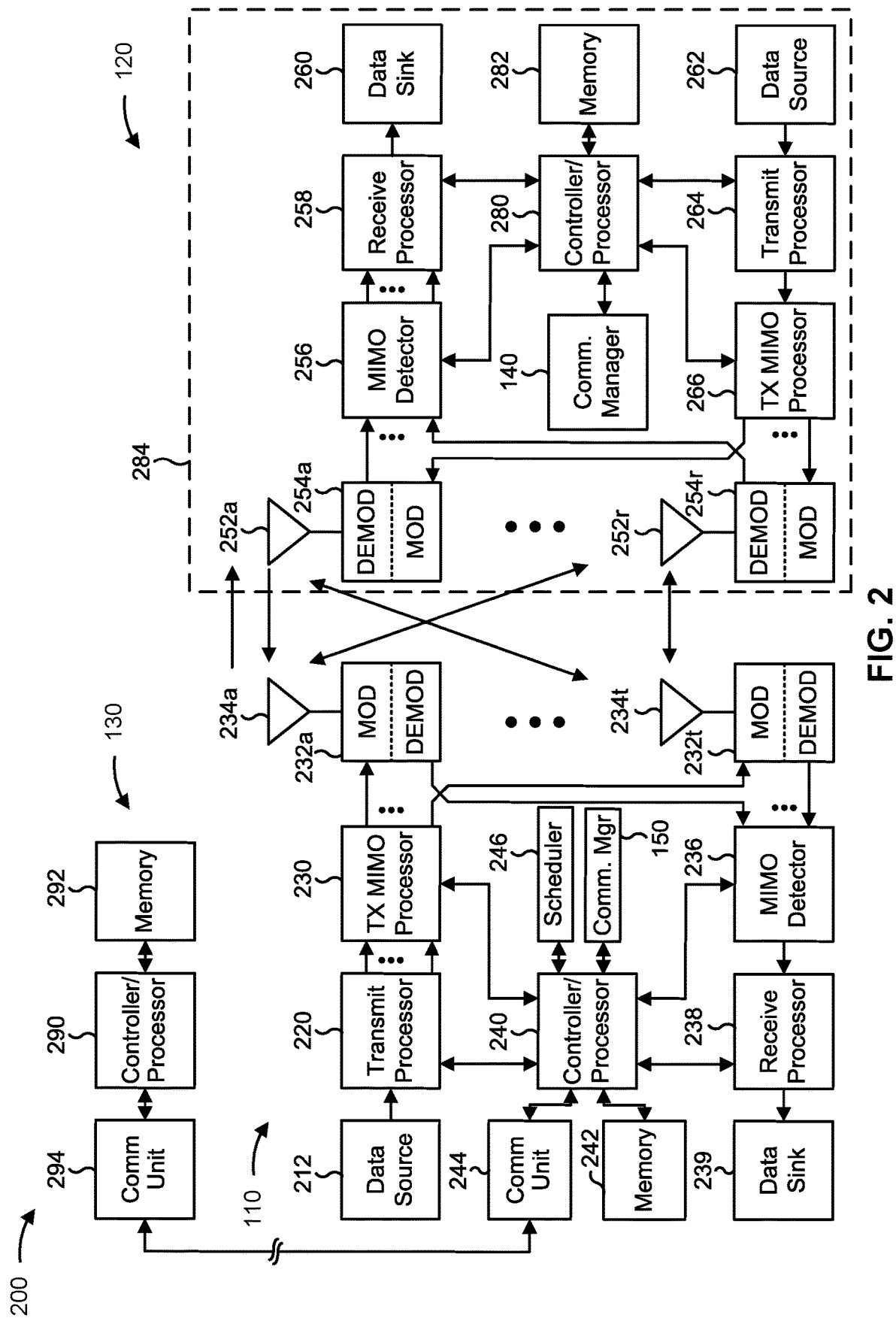
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the base station 110, the controller/processor 280 of the UE 120, and/or any other component(s) of FIG. 2 may perform one or more techniques associated with sidelink DRX support indication and detection, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving a transmission profile, of an application executing on the UE, that indicates whether sidelink DRX is required, or a sidelink communication that indicates whether sidelink DRX is supported; and/or means for communicating with one or more other UEs in accordance with a configuration for sidelink DRX, or with sidelink DRX disabled, based at least in part on the transmission profile or the sidelink communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
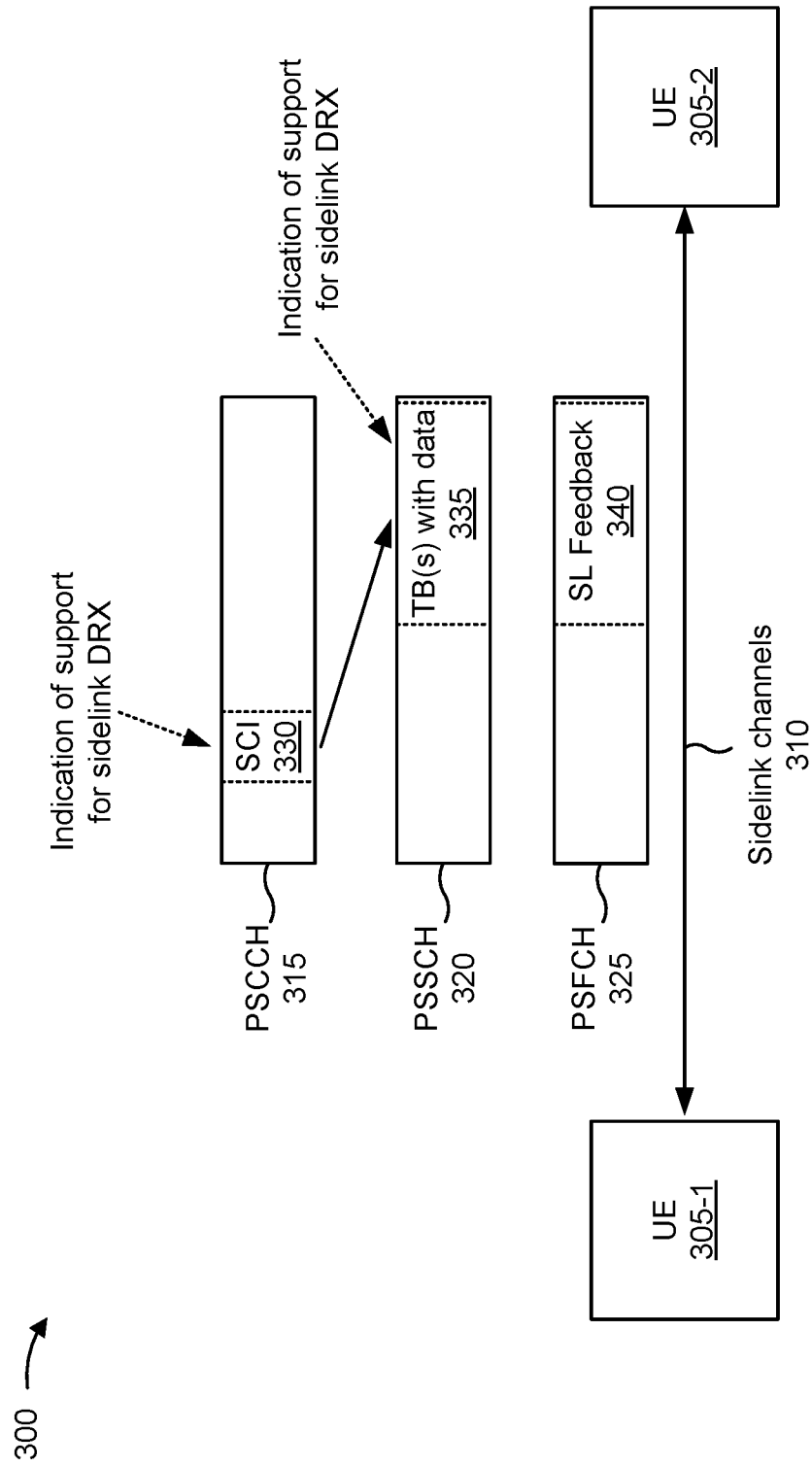
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305)

via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some examples, the UEs 305 (e.g., UE 305-1 and/or UE 305-2) may correspond to one or more other UEs described elsewhere herein, such as UE 120. In some examples, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a hybrid automatic repeat request (HARM) process ID, a new data indicator (NDI), a source identifier, a destination identifier, and/or a channel state information (CSI) report trigger.

In some examples, the one or more sidelink channels 310 may use resource pools. For example, a scheduling assignment (e.g., included in SCI 330) may be transmitted in sub-channels using specific resource blocks (RBs) across time. In some examples, data transmissions (e.g., on the PSSCH 320) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 305 may operate using a transmission mode where resource selection and/or scheduling is performed by the UE 305 (e.g., rather than a base station 110). In some examples, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSCCH-RSRP or PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As described herein, in some aspects, SCI 330 may include an indication of whether a UE 305 supports sidelink DRX. Additionally, or alternatively, a header field for TB 335 may include the indication. A UE 305 may support sidelink DRX if the UE 305 is capable of interpreting and applying a sidelink DRX configuration.

As indicated above, FIG. 3 is provided as an example. Other examples may differ from what is described with respect to FIG. 3.

Figure 4:
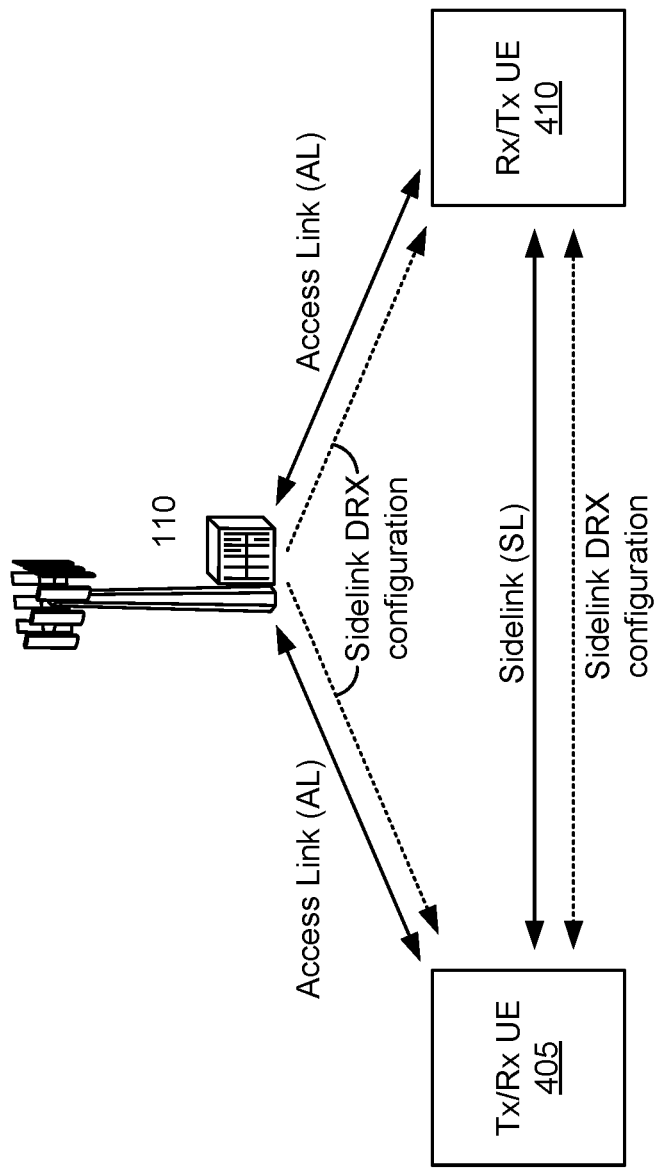
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As described herein, in some aspects, the Tx/Rx UE 405 and/or the Rx/Tx UE 410 may receive, via an access link, a configuration for sidelink DRX from the base station 110. For example, the base station 110 may provide a configuration for sidelink DRX in connection with sidelink broadcast communication and/or sidelink groupcast communication. In some other aspects, the Tx/Rx UE 405 and the Rx/Tx UE 410 may negotiate, via a sidelink, a configuration for sidelink DRX. For example, the Tx/Rx UE 405 and the Rx/Tx UE 410 may negotiate a configuration for sidelink DRX in connection with sidelink unicast communication and/or sidelink groupcast communication.

As indicated above, FIG. 4 is provided as an example. Other examples may differ from what is described with respect to FIG. 4.

Figure 5:
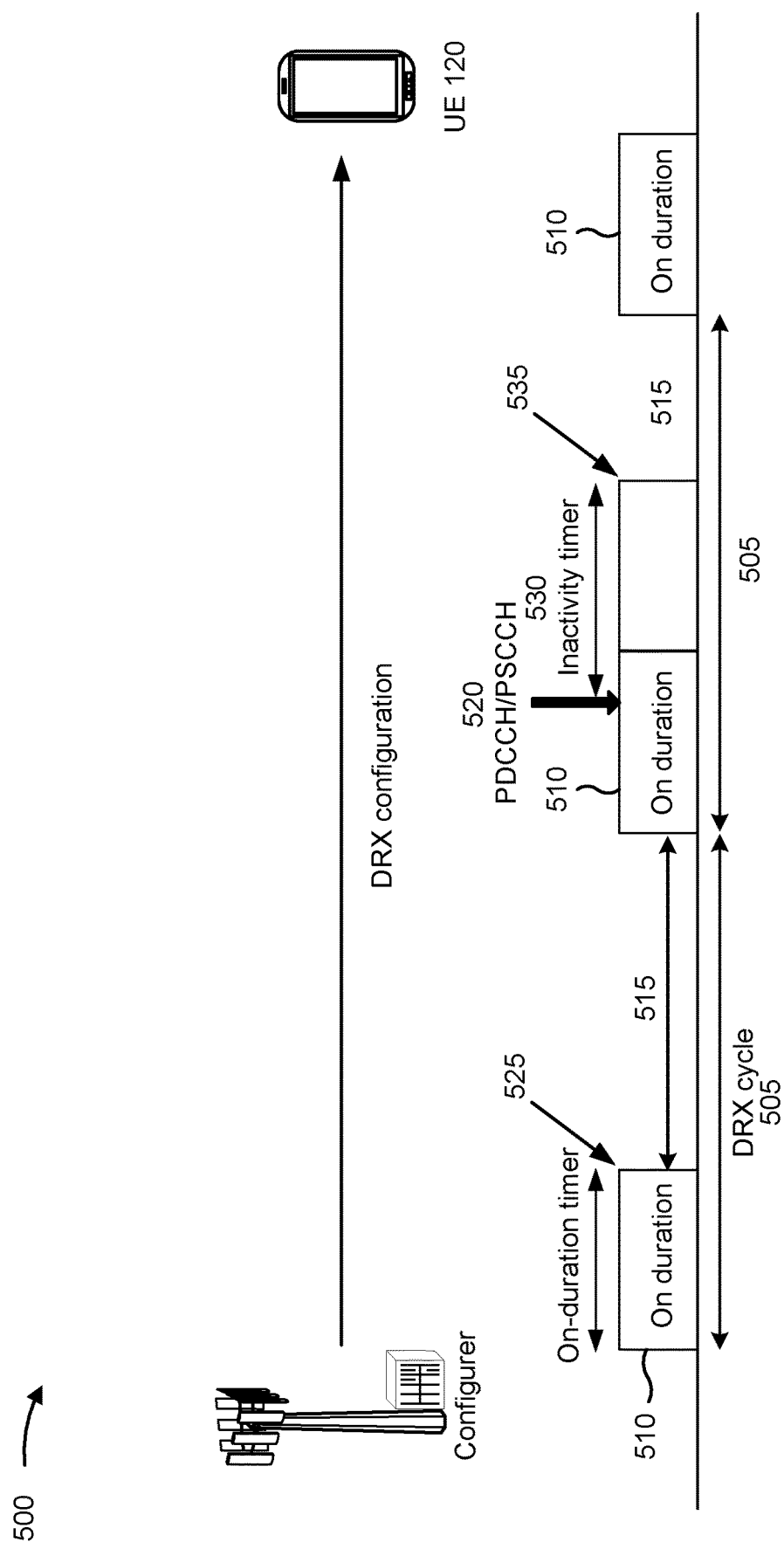
FIG. 5 is a diagram illustrating an example of a discontinuous reception (DRX) configuration, in accordance with the present disclosure.

FIG. 5 is a diagram illustrating an example 500 of a DRX configuration, in accordance with the present disclosure.

As shown in FIG. 5, a configurer (e.g., a base station 110 or a UE 120) may transmit a DRX configuration (e.g., an access link DRX configuration and/or a sidelink DRX configuration) to a UE 120 to configure a DRX cycle 505 for the UE 120. A DRX cycle 505 may include a DRX on duration 510 (e.g., during which a UE 120 is awake or in an active state) and an opportunity to enter a DRX sleep state 515. The time during which the UE 120 is configured to be in an active state during the DRX on duration 510 plus any extension of the on duration 510 due to an inactivity timer may be referred to as an active time, and the time during which the UE 120 is configured to be in the DRX sleep state 515 may be referred to as an inactive time. As described herein, the UE 120 may monitor a control channel (e.g., a PDCCH and/or a PSSCH) during the active time and may refrain from monitoring the control channel during the inactive time.

During the DRX on duration 510, the UE 120 may monitor a control channel, as shown by reference number 520. For example, the UE 120 may monitor the control channel for control information (e.g., downlink control information (DCI) and/or SCI) pertaining to the UE 120. If the UE 120 does not detect and/or successfully decode any control channel communications intended for the UE 120 during the DRX on duration 510, then the UE 120 may enter the sleep state 515 (e.g., for the inactive time) at the end of the DRX on duration 510, as shown by reference number 525. In this way, the UE 120 may conserve battery power and reduce power consumption. As shown, the DRX cycle 505 may repeat with a configured periodicity according to the DRX configuration.

If the UE 120 detects and/or successfully decodes a control channel communication intended for the UE 120, then the UE 120 may remain in an active state (e.g., awake) for the duration of a DRX inactivity timer 530 (e.g., which may extend into the configured inactive time of the current DRX cycle). The UE 120 may start the DRX inactivity timer 530 at a time at which the control channel communication is received (e.g., in a TTI in which the control channel communication is received, such as a slot or a subframe). The UE 120 may remain in the active state until the DRX inactivity timer 530 expires, at which time the UE 120 may enter the sleep state 515 (e.g., for the remainder of the inactive time of the current DRX cycle), as shown by reference number 535. During the duration of the DRX inactivity timer 530, the UE 120 may continue to monitor for control channel communications, may obtain a downlink data communication (e.g., on a data channel, such as a PDSCH and/or a PSSCH) scheduled by the control channel communication, and/or may prepare and/or transmit a communication (e.g., on a PUSCH and/or a PSSCH) scheduled by the control channel communication. The UE 120 may restart the DRX inactivity timer 530 after each detection of a control channel communication for the UE 120 for an initial transmission (e.g., but not for a retransmission). By operating in this manner, the UE 120 may conserve battery power and reduce power consumption by entering the sleep state 515.

In sidelink DRX, a receiving UE may wake up during an on duration (e.g., that is configured for the receiving UE) for reception. Moreover, a transmitting UE may use an on duration (e.g., that is configured for the transmitting UE) for transmission. The receiving UE and the transmitting UE may use the same DRX configuration or may use different DRX configurations (e.g., different DRX cycles).

In some cases, a UE that supports sidelink DRX (which may be referred to as a "supporting UE," a "non-legacy UE," or a "Release 17 UE") may engage in sidelink communication with a UE that does not support sidelink DRX (which may be referred to as a "non-supporting UE," a "legacy UE," or a "Release 16 UE"). However, a non-supporting UE may be unaware of the sidelink DRX schedule used by one or more supporting UEs. As a result, the non-supporting UE may perform a sidelink transmission outside of an on duration (e.g., during an inactive time) of the sidelink DRX schedule, thereby resulting in the transmission being missed by the supporting UEs, resulting in the need for excessive retransmission, or the like.

Sidelink DRX may be used in connection with sidelink broadcast communication, sidelink groupcast communication, and/or sidelink unicast communication. Groupcast communication may include managed groupcast, which uses signaling between group members for group management and coordination, and connection-less groupcast, which does not use signaling between group members for group management and coordination. As described above, these types of sidelink communication may involve both supporting UEs and non-supporting UEs.

For sidelink unicast communication involving a supporting UE and a non-supporting UE, negotiation between the UEs is supported, and therefore the aforementioned issues caused by the non-supporting UE are avoided. For example, in unicast, a transmitting UE and a receiving UE may negotiate a sidelink DRX configuration (e.g., using PC5-radio resource control (RRC) signaling). A non-supporting transmitting UE does not support transmitting a message containing a sidelink DRX configuration (e.g., a RRCReconfigurationSidelink message) to a supporting receiving UE. Thus, the supporting receiving UE does not receive a sidelink DRX configuration from the non-supporting transmitting UE, and therefore sidelink DRX is not configured for communications from the non-supporting transmitting UE to the supporting receiving UE. Moreover, a non-supporting receiving UE does not support a sidelink UE assistance information message for sidelink DRX configuration, and therefore the non-supporting receiving UE cannot properly decode a message containing a sidelink DRX configuration (e.g., a RRCReconfigurationSidelink message) received from a supporting transmitting UE. Thus, the non-supporting receiving UE cannot respond with a message indicating acceptance of the sidelink DRX configuration (e.g., a RRCReconfigurationCompleteSidelink message), and therefore sidelink DRX is not configured for communications from the supporting transmitting UE to the non-supporting receiving UE.

For some sidelink groupcast communication (e.g., managed groupcast) involving a supporting UE and a non-supporting UE, negotiation between the UEs is supported, and therefore the aforementioned issues caused by the non-supporting UE are avoided. As described above, managed groupcast may use group management signaling (e.g., at an application layer, for example, to assign group member identifiers) as well as signaling for sidelink DRX control and/or capability exchanges. Thus, if a group includes at least one non-supporting UE, the supporting UEs in the group may disable sidelink DRX. In some examples, in addition to an indication of a quantity of members in the group, an upper layer (e.g., an application layer) of a UE may also indicate to a lower layer (e.g., an access stratum (AS) layer), as part of an extended group member indication, a quantity of supporting UEs in the group, thereby enabling determination of whether the group includes a non-supporting UE (e.g., if the quantity of members in the group is greater than the quantity of supporting UEs in the group).

For sidelink broadcast communication and some other sidelink groupcast communication (e.g., connection-less groupcast), negotiation signaling between the UEs is not used. Here, a UE may obtain a sidelink DRX configuration from a serving base station (e.g., in a system information block (SIB) or in dedicated RRC signaling), or the UE may be configured, specified, or otherwise provisioned with the sidelink DRX configuration. As a result, cases may arise in sidelink communication where a receiving UE is a supporting UE and a transmitting UE is a non-supporting UE. Thus, the transmitting UE may transmit outside of a sidelink DRX on duration, as described above.

Some techniques and apparatuses described herein provide for indication and detection of support for sidelink DRX. In some aspects, a UE that supports sidelink DRX may disable sidelink DRX (e.g., deactivate a sidelink DRX configuration) based at least in part on an upper layer (e.g., application layer) configuration. For example, the UE may disable sidelink DRX for service types that support non-supporting UEs. In this way, the supporting UE does not use sidelink DRX if sidelink communication may involve a non-supporting UE, thereby preventing a situation in which the non-supporting UE transmits outside of an on duration of the supporting UE. In some aspects, a UE that supports sidelink DRX may transmit an indication that the UE supports sidelink DRX. In this way, a supporting UE may dynamically detect a non-supporting UE (e.g., because a transmission of the non-supporting UE lacks an indication of support for sidelink DRX), and the supporting UE may perform actions to account for the non-supporting UE (e.g., disabling sidelink DRX or forwarding packets transmitted by the non-supporting UE during an on duration). By identifying sidelink communications that may involve a non-supporting UE and/or by detecting a non-supporting UE, transmissions by a non-supporting UE outside of a DRX on duration may be prevented or accounted for, thereby improving the performance of sidelink communications.

As indicated above, FIG. 5 is provided as an example. Other examples may differ from what is described with respect to FIG. 5.

Figure 6:
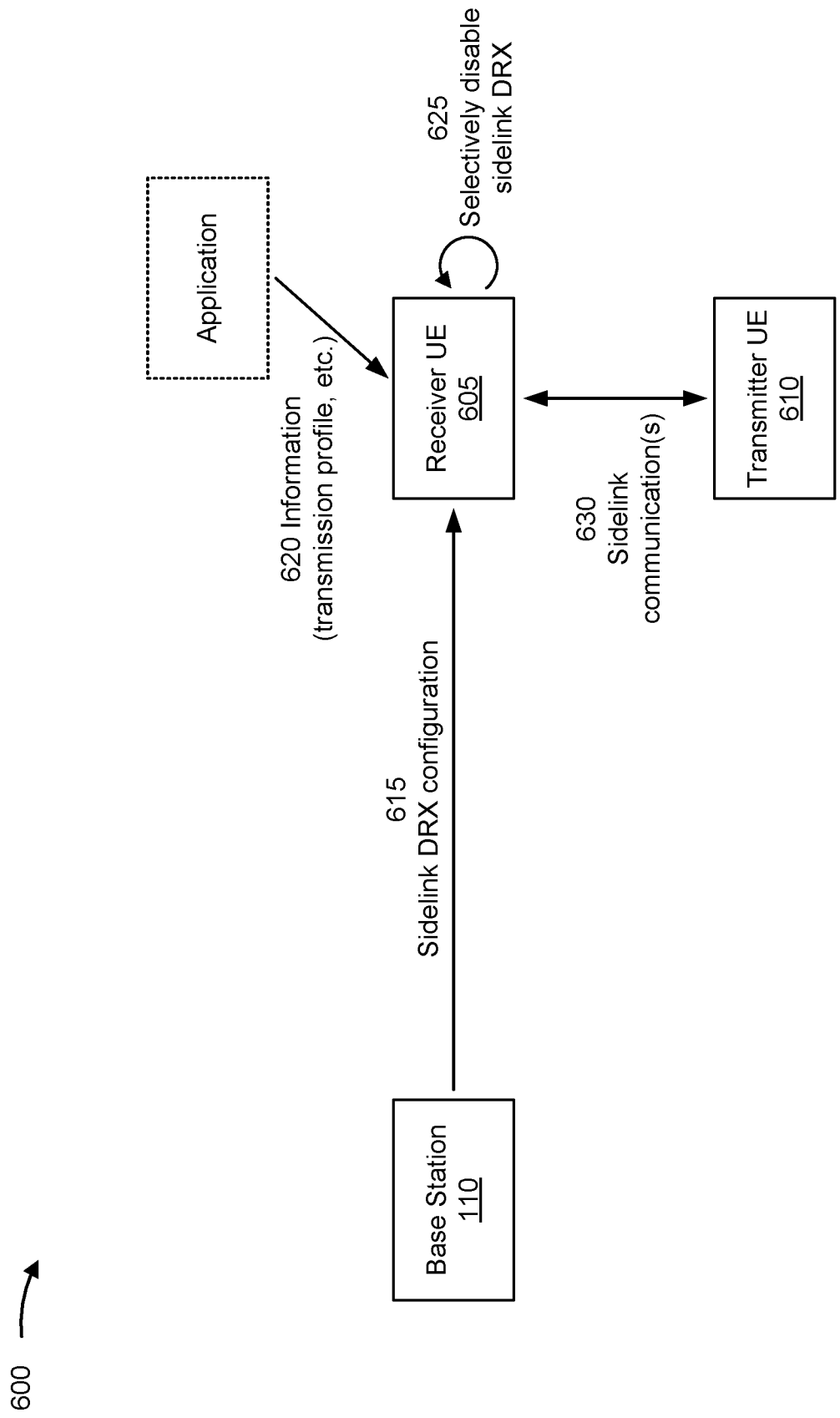
FIGS. 6-7 are diagrams illustrating examples associated with sidelink DRX support indication and detection, in accordance with the present disclosure.

FIG. 6 is a diagram illustrating an example 600 associated with sidelink DRX support indication and detection, in accordance with the present disclosure. As shown in FIG. 6, example 600 includes communication between a base station 110, a receiver UE 605, and a transmitter UE 610. The receiver UE 605 and/or the transmitter UE 610 may correspond to one or more UEs described elsewhere herein, such as UE 120, UE 305, UE 405, UE 410, or the like.

In some aspects, the UEs 605, 610 may be integrated into a vehicle, may be located in or on the vehicle, or the like. A vehicle may include an autonomous vehicle, a semi-autonomous vehicle, a non-autonomous vehicle, or the like. Additionally, or alternatively, one or more of the UEs 605, 610 may not be associated with a vehicle. For example, a UE 605, 610 may be associated with infrastructure (e.g., traffic infrastructure, such as a traffic signal, a lane signal, a sensor, a traffic controller system, and/or the like), a pedestrian (e.g., via a wearable device), or the like.

The receiver UE 605 and the transmitter UE 610 may communicate via one or more sidelink channels 310 (e.g., to exchange SCI 330 and corresponding TBs 335), as described above in connection with FIG. 3. In some aspects, communication between the receiver UE 605 and the transmitter UE 610 may be broadcast communication or groupcast communication (e.g., connection-less groupcast). In some aspects, the receiver UE 605 may support sidelink DRX. In some aspects, the transmitter UE 610 may not support sidelink DRX. As used herein, the term receiver UE 605 is used to describe a UE that receives a sidelink communication from the transmitter UE 610. A single UE (e.g., UE 120) may be capable of operating as a transmitter UE 610 (e.g., that transmits communications to other UEs) and a receiver UE 605 (e.g., that receives communications from other UEs).

As shown by reference number 615, the base station 110 may transmit, and the receiver UE 605 may receive, a sidelink DRX configuration. The sidelink DRX configuration may indicate a DRX cycle for the receiver UE 605, as described herein. For example, the sidelink DRX configuration may indicate an on duration (e.g., an active time period) during which the receiver UE 605 is to operate in an active state, and an inactive time period during which the receiver UE 605 is to operate in a sleep state. In some aspects, the receiver UE 605 may receive the sidelink DRX configuration from another supporting UE. The receiver UE 605 may operate in a DRX mode, in connection with sidelink communication, in accordance with the sidelink DRX configuration.

As shown by reference number 620, the receiver UE 605 may receive information from an application (e.g., a D2D application, a V2X application, or the like) executing on the UE 120. In some aspects, the receiver UE 605 may receive, from an application, information identifying a service type of the application, one or more quality of service (QoS) parameters associated with the application and/or the service type, a transmission (Tx) profile associated with the application and/or the service type, or the like. In some aspects, if the receiver UE 605 is executing multiple applications (e.g., D2D applications, V2X applications, or the like), the receiver UE 605 may receive such information for each of the applications.

A service type may indicate a type of service (e.g., a V2X service, or the like) associated with the application, such as a location-based service, an intersection assist service, a platooning service (e.g., where one or more trailing vehicles or trailing UEs follow a lead vehicle or lead UE), a cooperative adaptive cruise control (CACC) service, a sensor sharing service (e.g., where sensor information measured by one UE is shared with one or more other UEs), or the like. A service type may be identified by a service type identifier, which may include, for example, a provider service identifier (PSID), an intelligent transport system application identifier (ITS-AID), or the like. A transmission profile may indicate, for example, a maximum transmit power, a set of supported MCSs, an HARQ configuration (e.g., for repetitions, acknowledgement (ACK) or negative acknowledgement (NACK) feedback, or the like), a carrier aggregation configuration, a transmission diversity characteristic (e.g., for time hopping, frequency hopping, repetitions, or the like), or the like. In some aspects, the transmission profile may include an indication of whether sidelink DRX is required (e.g., whether the receiver UE 605 is required to use sidelink DRX when using the transmission profile).

In some aspects, the receiver UE 605 may store information that identifies associations between service types and transmission profiles (e.g., in connection with groupcast or broadcast traffic). For example, the receiver UE 605 may be configured (e.g., by the base station 110) with a mapping of services type(s) to transmission profile(s). Thus, based at least in part on an association of a service type and a transmission profile, the receiver UE 605 may identify whether sidelink DRX is required in connection with the service type.

A non-supporting UE (e.g., the transmitter UE 610) may also receive information (e.g., a transmission profile) from an application executing on the non-supporting UE. However, the non-supporting UE may lack an ability to understand a sidelink DRX indication in a transmission profile, and therefore, the non-supporting UE would not pass the transmission profile to an AS layer of the non-supporting UE. As a result, in a transmission scenario, the non-supporting UE would not activate sidelink DRX and may perform sidelink transmissions outside of an active time period for sidelink DRX. Therefore, the non-supporting UE may be retrofit to pass the transmission profile to the AS layer and disable the service type associated with the transmission profile, or the non-supporting UE may be configured to not support a service type for which a transmission profile is configured. In a reception scenario, the non-supporting UE would not activate sidelink DRX, which would not cause issues for receiving data packets.

As shown by reference number 625, the receiver UE 605 may selectively disable sidelink DRX. For example, the receiver UE 605 may selectively disable sidelink DRX, in connection with a service type of interest to the receiver UE 605, based at least in part on whether the transmission profile indicates that sidelink DRX is required (e.g., which may be explicitly indicated or implicitly indicated). In other words, if the receiver UE 605 is interested in receiving communications for a service type, the receiver UE 605 may selectively disable sidelink DRX based at least in part on whether a transmission profile associated with the service type indicates that sidelink DRX is required.

In some aspects, if the transmission profile indicates that sidelink DRX is required, the receiver UE 605 may not disable sidelink DRX. For example, the receiver UE 605 may assume that communications for the service type are always transmitted by a UE that supports sidelink DRX. In some aspects, if the transmission profile does not indicate that sidelink DRX is required, the receiver UE 605 may disable sidelink DRX. In some aspects, if the transmission profile does not indicate that sidelink DRX is required, the receiver UE 605 may rely on dynamic detection procedures, as described below, to determine whether to disable sidelink DRX.

As shown by reference number 630, the receiver UE 605 may communicate with the transmitter UE 610 (e.g., the receiver UE 605 may communicate with one or more other UEs). For example, the receiver UE 605 may receive one or more sidelink communications from the transmitter UE 610. The receiver UE 605 may communicate with the transmitter UE 610 (e.g., with one or more other UEs) in accordance with the configuration for sidelink DRX or with sidelink DRX disabled, as described above. For example, the receiver UE 605 may communicate, in connection with a service type, in accordance with the configuration for sidelink DRX, or with sidelink DRX disabled, based at least in part on an indication, in a transmission profile associated with the service type, of whether sidelink DRX is required. As described above, the receiver UE 605 may communicate in accordance with the configuration for sidelink DRX if the indication indicates that sidelink DRX is required. Alternatively, the receiver UE 605 may communicate with sidelink DRX disabled if the indication does not indicate that sidelink DRX is required.

As indicated above, FIG. 6 is provided as an example. Other examples may differ from what is described with respect to FIG. 6.

Figure 7:
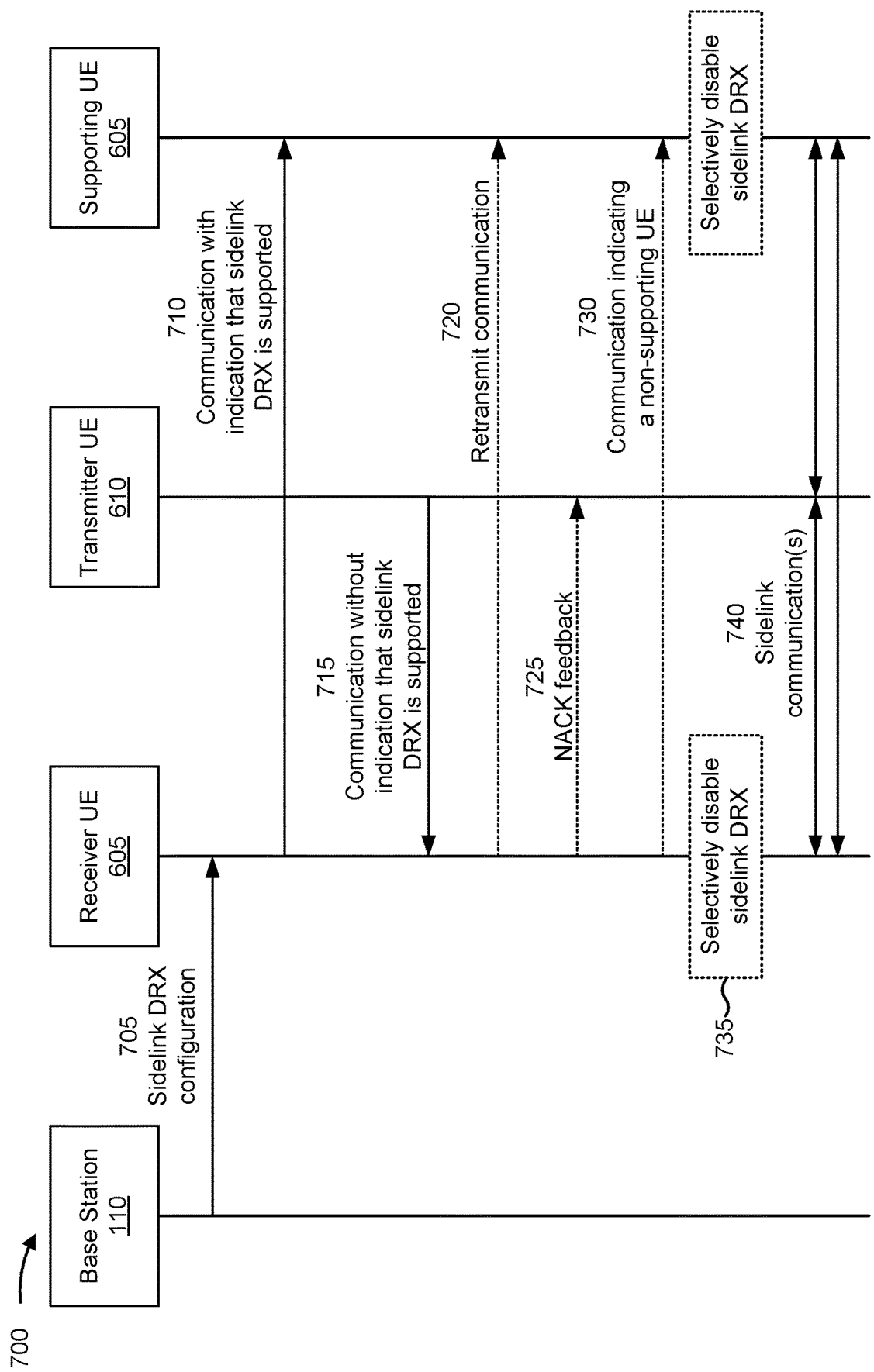

FIG. 7 is a diagram illustrating an example 700 associated with sidelink DRX support indication and detection, in accordance with the present disclosure. As shown in FIG. 7, example 700 includes communication between a base station 110, a receiver UE 605, a transmitter UE 610, and a supporting UE 605, as described above. The supporting UE 605 may be a receiver UE 605, as described herein.

As shown by reference number 705, the base station 110 may transmit, and the receiver UE 605 may receive, a sidelink DRX configuration, in a similar manner as described in connection with FIG. 6. In some aspects, the receiver UE 605 may receive the sidelink DRX configuration from another supporting UE (e.g., from the supporting UE 605). The supporting UE 605 may also receive a sidelink DRX configuration from the base station 110 and/or another supporting UE (e.g., the receiver UE 605).

As shown by reference number 710, the receiver UE 605 may transmit, to the supporting UE 605 (e.g., to one or more supporting UEs) via a sidelink, a sidelink communication that includes an indication (e.g., an explicit indication) that sidelink DRX is supported by the receiver UE 605 (e.g., the sidelink communication indicates that sidelink DRX is supported by the receiver UE 605 if the sidelink communication includes the indication that sidelink DRX is supported by the receiver UE 605). The receiver UE 605 may include the indication because the receiver UE 605 is a supporting UE. That is, a supporting UE (e.g., all supporting UEs) may include an indication of support for sidelink DRX with each sidelink transmission in order to enable other supporting UEs to dynamically detect (e.g., infer) when a sidelink transmission is from a non-supporting UE (e.g., based at least in part on a lack of such an indication). Thus, the transmitter UE 610 may also receive the sidelink communication that includes the indication, but the transmitter UE 610 would be unable to interpret the indication.

In some aspects, the indication may be in SCI of the sidelink communication. For example, the sidelink communication may include a PSCCH or a PSSCH communication that includes SCI with the indication. The SCI may be SCI-1 or SCI-2, as described above. In some aspects, the indication may be in a medium access control (MAC) header field of the sidelink communication. For example, the sidelink communication may include a data packet with a MAC layer header that includes the indication in a field (e.g., in a v-field). In some aspects, the indication is in a MAC control element (MAC-CE) of the sidelink communication. For example, the sidelink communication may include a data packet with the MAC-CE. In some aspects, the indication may be in a packet data convergence protocol (PDCP) header field of the sidelink communication. For example, the sidelink communication may include a data packet with a PDCP header that includes the indication in a field.

As shown by reference number 715, the receiver UE 605 may receive, from the transmitter UE 610, a sidelink communication that does not include an indication (e.g., an explicit indication) that sidelink DRX is supported by the transmitter UE 610. Based at least in part on receiving the sidelink communication that does not include the indication, the receiver UE 605 may infer that the transmitter UE 610 is a non-supporting UE (e.g., the sidelink communication indicates that sidelink DRX is not supported by the transmitter UE 610 if the sidelink communication does not include the indication that sidelink DRX is supported by the transmitter UE 610).

In some aspects, the transmitter UE 610 may transmit, and the receiver UE 605 may receive, the sidelink communication during an active time period (e.g., during an on duration) for sidelink DRX (e.g., in accordance with the sidelink DRX configuration). Thus, the receiver UE 605, as well as any other supporting UEs receiving the sidelink communication, may detect that the transmitter UE 610 is a non-supporting UE (e.g., because the sidelink communication does not include the indication).

In some aspects, the transmitter UE 610 may transmit, and the receiver UE 605 may receive, the sidelink communication during an inactive time period (e.g., outside of the on duration) for sidelink DRX (e.g., in accordance with the sidelink DRX configuration). Here, the sidelink communication could be detected only by a supporting UE that wakes up outside of the on duration for sidelink DRX. Thus, the receiver UE 605 may operate in an active state during an inactive time period (e.g., outside of the on duration) for sidelink DRX (e.g., the receiver UE 605 may wake up during the inactive time period) in order to receive the sidelink communication from the transmitter UE 610. In other words, the receiver UE 605 may wake up outside of an on duration for the receiver UE 605 in order to monitor for sidelink transmissions (e.g., monitor for PSCCH and/or PSSCH communications that do not include an indication of support for sidelink DRX).

In some aspects, the receiver UE 605 may be randomly identified, from a plurality of supporting UEs, to operate in the active state during the inactive time period. For example, different supporting UEs may wake up, at random, at different times during one or more inactive time periods (e.g., to avoid all supporting UEs having to wake up). The receiver UE 605 may be randomly identified to operate in the active state during the inactive time period according to an identifier (e.g., based at least in part on a hash value of a layer 2 (L2) identifier) of the receiver UE 605. That is, the different times at which the different supporting UEs wake up may be based at least in part on respective identifiers of the supporting UEs.

In some aspects, the receiver UE 605 may operate in the active state during the inactive time period based at least in part on a quantity of non-supporting UEs that have been identified by the receiver UE 605 (e.g., previously, or currently, by waking up). For example, based at least in part on a quantity of transmissions observed by the receiver UE 605 outside of the on duration of the receiver UE 605, the receiver UE 605 may determine the quantity of non-supporting UEs in proximity. Continuing with the example, the receiver UE 605 may wake up for a portion of the inactive time period that is based at least in part on the quantity of non-supporting UEs (e.g., a greater quantity of identified non-supporting UEs may correspond to the receiver UE 605 waking for a greater portion of the inactive time period). In some aspects, the receiver UE 605 may operate in the active state during the inactive time period based at least in part on a quantity of non-supporting UEs in a group (e.g., a managed group) of UEs that includes the receiver UE 605. For example, the receiver UE 605 may determine the quantity of non-supporting UEs in the group based at least in part on group member identifiers and/or a group size, in a similar manner as described above.

As shown by reference number 720, the receiver UE 605 may retransmit, and the supporting UE 605 (e.g., one or more supporting UEs) may receive, the sidelink communication (e.g., transport block) if the sidelink communication is received by the receiver UE 605 during the inactive time period (e.g., outside of the DRX on duration). In other words, the receiver UE 605 may forward the sidelink communication if the sidelink communication is received by the receiver UE 605 during the inactive time period. For example, the receiver UE 605 may store (e.g., cache) the sidelink communication received by the receiver UE 605 during the inactive time period, and based at least in part on a determination that the transmitter UE 610 does not support sidelink DRX (e.g., the sidelink communication from the transmitter UE 610 did not include an indication of support for sidelink DRX), the receiver UE 605 may retransmit the sidelink communication. The receiver UE 605 may retransmit the sidelink communication during an active time period (e.g., during an on duration) for sidelink DRX. In some aspects, to avoid duplication, the receiver UE 605 may be the only supporting UE that retransmits the sidelink communication from the transmitter UE 610 (e.g., which may be coordinated in a managed groupcast scenario).

As shown by reference number 725, the receiver UE 605 may transmit, and the transmitter UE 610 may receive, negative acknowledgment (NACK) feedback for the sidelink communication if the sidelink communication is received by the receiver UE 605 during the inactive time period (e.g., in addition to, or as an alternative to, the operation described in connection with reference number 720). The receiver UE 605 may transmit the NACK feedback regardless of a reception status of the sidelink communication at the receiver UE 605. That is, the receiver UE 605 may transmit the NACK feedback even if the sidelink communication was successfully received by the receiver UE 605 (e.g., even if the receiver UE 605 would transmit ACK feedback for the sidelink communication under ordinary circumstances). In this way, based at least in part on receiving the NACK feedback, the transmitter UE 610 may retransmit the sidelink communication (e.g., during an on duration for sidelink DRX). In some aspects, the receiver UE 605 and the transmitter UE 610 may be engaged in sidelink groupcast communication, in which HARQ feedback is enabled.

As shown by reference number 730, the receiver UE 605 may transmit, and the supporting UE 605 (e.g., one or more supporting UEs) may receive, a sidelink communication that indicates a non-supporting UE (e.g., indicates the presence of the non-supporting UE, such as the transmitter UE 610) if the sidelink communication transmitted by the transmitter UE 610 is received by the receiver UE 605 during the inactive time period (e.g., in addition to, or as an alternative to, one or more of the operations described in connection with reference numbers 720 and 725). The receiver UE 605 may transmit the sidelink communication that indicates the non-supporting UE during an active time period (e.g., during an on duration) for sidelink DRX.

In some aspects, the receiver UE 605 may explicitly indicate the non-supporting UE. For example, the receiver UE 605 may transmit (e.g., during an active time period, such as an on duration), and the supporting UE 605 (e.g., one or more supporting UEs) may receive, a sidelink communication (e.g., a data packet) that includes an indication of a non-supporting UE (e.g., in SCI, a MAC header field, a MAC-CE, a PDCP header field, or the like, in a similar manner as described above). In some aspects, the receiver UE 605 may implicitly indicate the non-supporting UE. For example, the receiver UE 605 may transmit (e.g., during an active time period, such as an on duration), and the supporting UE 605 (e.g., one or more supporting UEs) may receive, a sidelink communication (e.g., a data packet) that does not include an indication of support for sidelink DRX (even though the receiver UE 605 supports sidelink DRX), in a similar manner as described above. If the receiver UE 605 does not have a data packet for sidelink transmission (e.g., for use in indicating the presence of a non-supporting UE), the receiver UE 605 may transmit standalone SCI or a MAC-CE to indicate the presence of a non-supporting UE (e.g., explicitly or implicitly, as described above). In this way, the receiver UE 605 may warn other supporting UEs of the presence of a non-supporting UE that was detected by the receiver UE 605 outside of an on duration.

As shown by reference number 735, the receiver UE 605 may selectively disable sidelink DRX. For example, the receiver UE 605 may disable sidelink DRX based at least in part on detecting a non-supporting UE (e.g., the transmitter UE 610), as described above. In some aspects, the receiver UE 605 may disable sidelink DRX based at least in part on receiving the sidelink communication, that does not include an indication of support for sidelink DRX, from the transmitter UE 610, during an active time period (e.g., during an on duration) for sidelink DRX. In some aspects, the receiver UE 605 may disable sidelink DRX based at least in part on receiving the sidelink communication, that does not include an indication of support for sidelink DRX, from the transmitter UE 610, during an inactive time period (e.g., outside of an on duration) for sidelink DRX. In some aspects, based at least in part on receiving the sidelink communication during the inactive time period, the receiver UE 605 may perform a transmission, as described by reference numbers 720, 725, and/or 730, rather than disabling sidelink DRX. In some aspects, one or more supporting UEs (e.g., the supporting UE 605) may disable sidelink DRX, or perform other packet loss mitigation operations (as described herein), based at least in part on receiving the sidelink communication from the receiver UE 605 that indicates a non-supporting UE.

As shown by reference number 740, the receiver UE 605 may communicate with the transmitter UE 610 and/or the supporting UE 605 (e.g., the receiver UE 605 may communicate with one or more other UEs). For example, the receiver UE 605 may receive one or more sidelink communications from the transmitter UE 610. The receiver UE 605 may communicate with the transmitter UE 610 and/or the supporting UE 605 (e.g., with one or more other UEs) in accordance with the configuration for sidelink DRX or with sidelink DRX disabled, as described above. For example, the receiver UE 605 may communicate in accordance with the configuration for sidelink DRX, or with sidelink DRX disabled, based at least in part on whether the receiver UE 605 receives a sidelink communication that does not include an indication of support for sidelink DRX. As described above, the receiver UE 605 may communicate with sidelink DRX disabled if a sidelink communication that does not include an indication of support for sidelink DRX is received by the receiver UE 605. In this way, after the transmitter UE 610 is detected as a non-supporting UE, additional loss of transmissions from the transmitter UE 610 may be avoided.

Similarly, the supporting UE 605 may communicate with the transmitter UE 610 and/or the receiver UE 605 (e.g., with one or more other UEs) in accordance with the configuration for sidelink DRX or with sidelink DRX disabled based at least in part on whether the supporting UE 605 received a sidelink communication that does not include an indication of support for sidelink DRX (e.g., from the transmitter UE 610 or from the receiver UE 605), in a similar manner as described above. Moreover, the supporting UE 605 may communicate with the transmitter UE 610 and/or the receiver UE 605 (e.g., with one or more other UEs) in accordance with the configuration for sidelink DRX or with sidelink DRX disabled based at least in part on whether the supporting UE 605 received a sidelink communication (e.g., from the receiver UE 605) that includes an indication of a non-supporting UE. For example, the supporting UE 605 may communicate with sidelink DRX disabled if a sidelink communication that includes an indication of a non-supporting UE is received by the supporting UE 605.

As indicated above, FIG. 7 is provided as an example. Other examples may differ from what is described with respect to FIG. 7.

Figure 8:
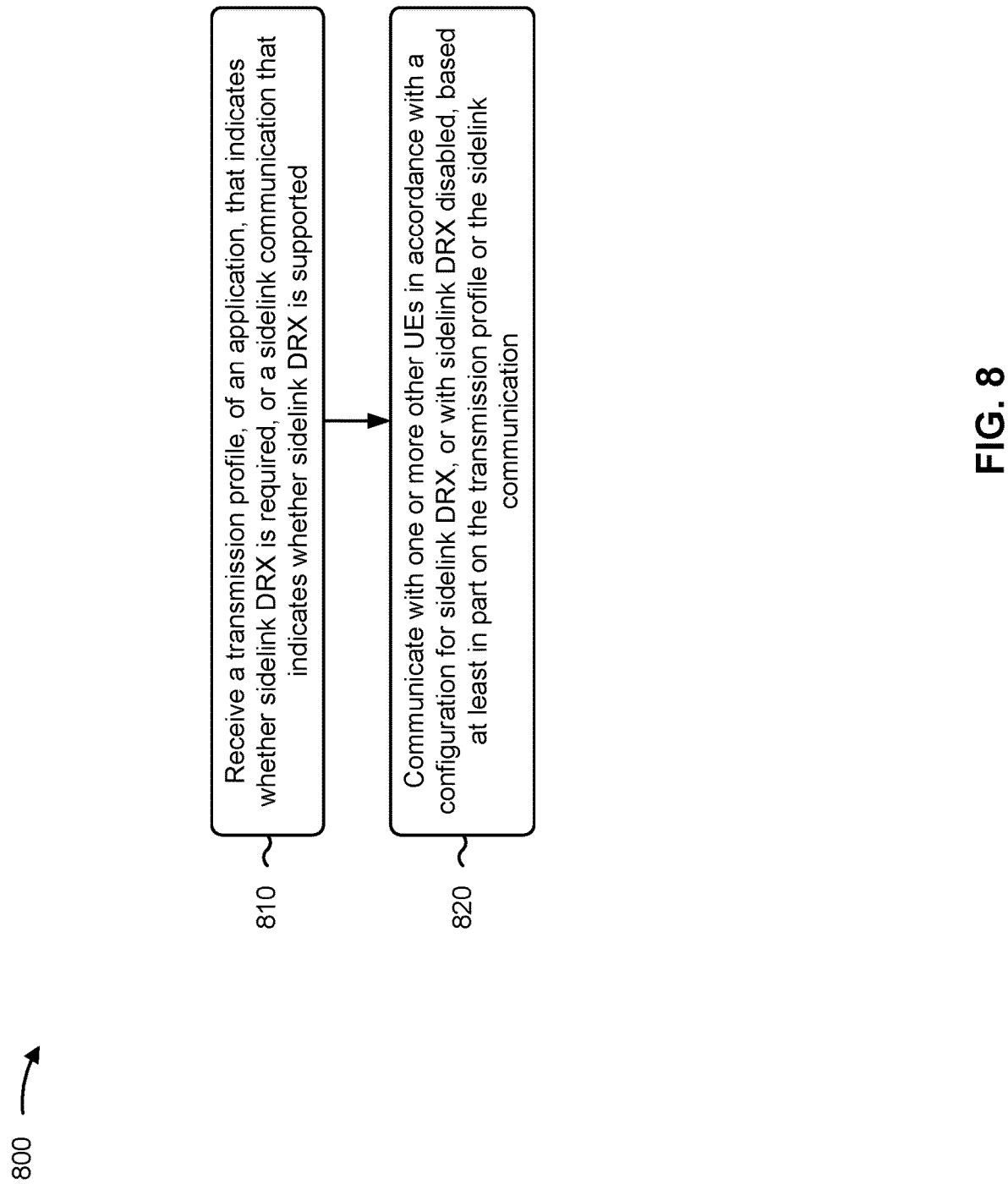
FIG. 8 is a diagram illustrating an example process associated with sidelink DRX support indication and detection, in accordance with the present disclosure.

FIG. 8 is a diagram illustrating an example process 800 performed, for example, by a UE, in accordance with the present disclosure. Example process 800 is an example where the UE (e.g., UE 120) performs operations associated with sidelink DRX support indication and detection.

As shown in FIG. 8, in some aspects, process 800 may include receiving a transmission profile, of an application, that indicates whether sidelink DRX is required, or a sidelink communication that indicates whether sidelink DRX is supported (block 810). For example, the UE (e.g., using communication manager 140, profile component 912, and/or reception component 902, depicted in FIG. 9) may receive a transmission profile, of an application executing on the UE, that indicates whether sidelink DRX is required, or a sidelink communication that indicates whether sidelink DRX is supported, as described above.

As further shown in FIG. 8, in some aspects, process 800 may include communicating with one or more other UEs in accordance with a configuration for sidelink DRX, or with sidelink DRX disabled, based at least in part on the transmission profile or the sidelink communication (block 820). For example, the UE (e.g., using communication manager 140 reception component 902, and/or transmission component 904, depicted in FIG. 9) may communicate with one or more other UEs in accordance with a configuration for sidelink DRX, or with sidelink DRX disabled, based at least in part on the transmission profile or the sidelink communication, as described above.

Process 800 may include additional aspects, such as any single aspect or any combination of aspects described below and/or in connection with one or more other processes described elsewhere herein.

Figure 9:
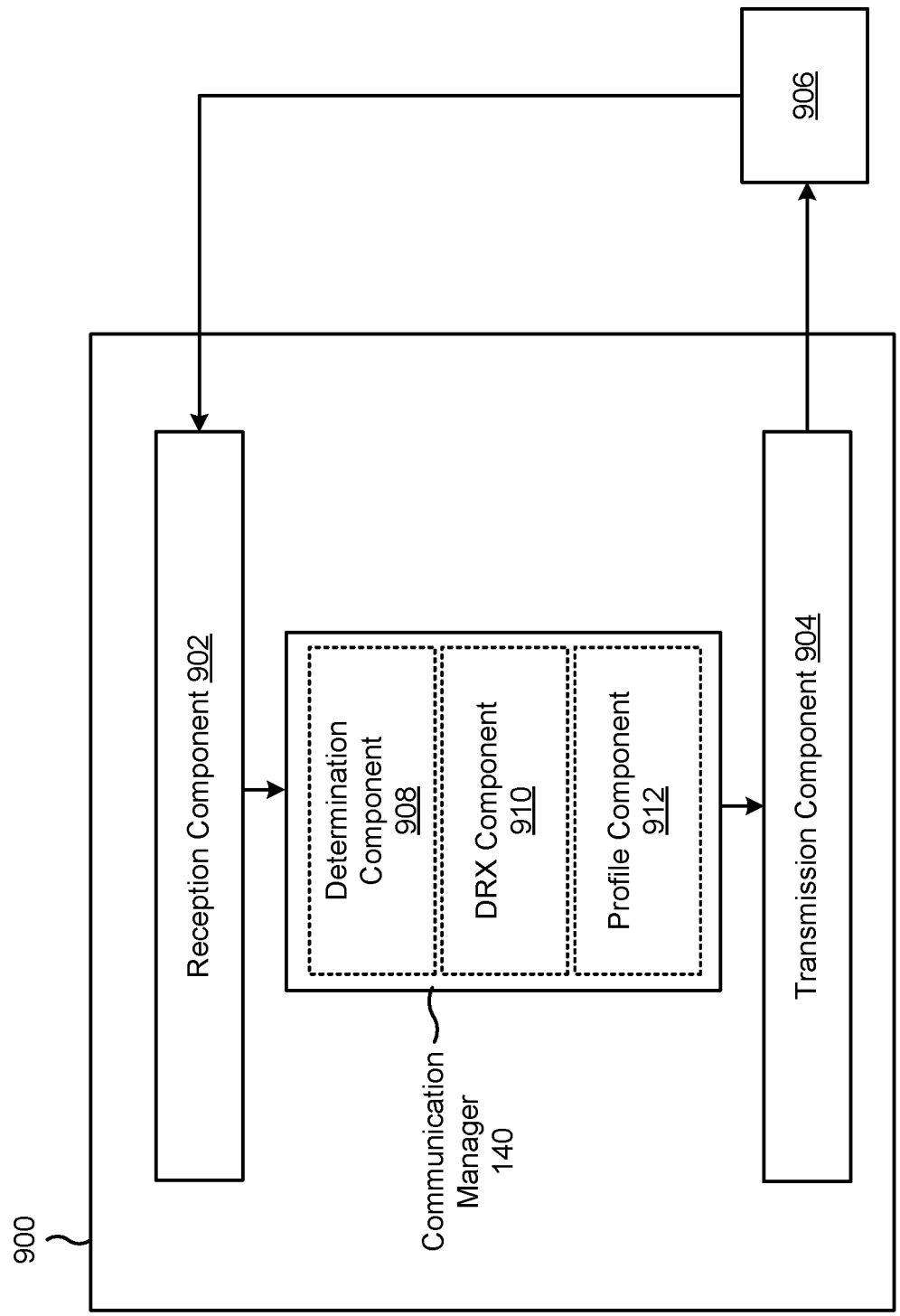
FIG. 9 is a diagram of an example apparatus for wireless communication, in accordance with the present disclosure.

In a first aspect, process 800 includes receiving (e.g., using communication manager 140 and/or reception component 902, depicted in FIG. 9) the configuration for sidelink DRX.

In a second aspect, alone or in combination with the first aspect, process 800 includes determining (e.g., using communication manager 140 and/or determination component 908, depicted in FIG. 9) whether to disable sidelink DRX based at least in part on the transmission profile or the sidelink communication.

In a third aspect, alone or in combination with one or more of the first and second aspects, communicating with the one or more other UEs is in connection with a service type, and the transmission profile is associated with the service type and includes an indication of whether sidelink DRX is required.

In a fourth aspect, alone or in combination with one or more of the first through third aspects, communicating with the one or more other UEs is in accordance with the configuration for sidelink DRX if the indication indicates that sidelink DRX is required.

In a fifth aspect, alone or in combination with one or more of the first through fourth aspects, communicating with the one or more other UEs is with sidelink DRX disabled if the indication does not indicate that sidelink DRX is required.

In a sixth aspect, alone or in combination with one or more of the first through fifth aspects, the sidelink communication is received from a different UE and indicates that sidelink DRX is not supported by the different UE if the sidelink communication does not include an indication that sidelink DRX is supported by the different UE.

In a seventh aspect, alone or in combination with one or more of the first through sixth aspects, communicating with the one or more other UEs is with sidelink DRX disabled based at least in part on the sidelink communication not including the indication that sidelink DRX is supported by the different UE.

In an eighth aspect, alone or in combination with one or more of the first through seventh aspects, the sidelink communication is received during an active time period for sidelink DRX.

In a ninth aspect, alone or in combination with one or more of the first through eighth aspects, the sidelink communication is received during an inactive time period for sidelink DRX.

In a tenth aspect, alone or in combination with one or more of the first through ninth aspects, process 800 includes operating (e.g., using communication manager 140 and/or DRX component 910, depicted in FIG. 9) in an active state during an inactive time period for sidelink DRX to receive the sidelink communication.

In an eleventh aspect, alone or in combination with one or more of the first through tenth aspects, the UE is randomly identified, from a plurality of UEs, to operate in the active state during the inactive time period for sidelink DRX.

In a twelfth aspect, alone or in combination with one or more of the first through eleventh aspects, operating in the active state during the inactive time period for sidelink DRX is based at least in part on a quantity of different UEs, that do not support sidelink DRX, that have been identified by the UE.

In a thirteenth aspect, alone or in combination with one or more of the first through twelfth aspects, operating in the active state during the inactive time period for sidelink DRX is based at least in part on a quantity of different UEs, that do not support sidelink DRX, in a managed group of UEs that includes the UE.

In a fourteenth aspect, alone or in combination with one or more of the first through thirteenth aspects, process 800 includes retransmitting (e.g., using communication manager 140 and/or transmission component 904, depicted in FIG. 9) the sidelink communication during an active time period for sidelink DRX if the sidelink communication is received during an inactive time period for sidelink DRX.

In a fifteenth aspect, alone or in combination with one or more of the first through fourteenth aspects, process 800 includes transmitting (e.g., using communication manager 140 and/or transmission component 904, depicted in FIG. 9) negative acknowledgment feedback for the sidelink communication, regardless of a reception status of the sidelink communication at the UE, if the sidelink communication is received during an inactive time period for sidelink DRX.

In a sixteenth aspect, alone or in combination with one or more of the first through fifteenth aspects, process 800 includes transmitting (e.g., using communication manager 140 and/or transmission component 904, depicted in FIG. 9) a different sidelink communication that does not include an indication that sidelink DRX is supported by the UE if the sidelink communication is received during an inactive time period for sidelink DRX.

In a seventeenth aspect, alone or in combination with one or more of the first through sixteenth aspects, process 800 includes transmitting (e.g., using communication manager 140 and/or transmission component 904, depicted in FIG. 9) a different sidelink communication that includes an indication of a non-supporting UE for sidelink DRX if the sidelink communication is received during an inactive time period for sidelink DRX.

In an eighteenth aspect, alone or in combination with one or more of the first through seventeenth aspects, the sidelink communication includes an indication of a non-supporting UE for sidelink DRX.

In a nineteenth aspect, alone or in combination with one or more of the first through eighteenth aspects, communicating with the one or more other UEs is with sidelink DRX disabled based at least in part on the indication of the non-supporting UE for sidelink DRX.

In a twentieth aspect, alone or in combination with one or more of the first through nineteenth aspects, the sidelink communication is received from a different UE and indicates that sidelink DRX is supported by the different UE if the sidelink communication includes an indication that sidelink DRX is supported by the different UE.

In a twenty-first aspect, alone or in combination with one or more of the first through twentieth aspects, process 800 includes transmitting (e.g., using communication manager 140 and/or transmission component 904, depicted in FIG. 9) a different sidelink communication that includes an indication that sidelink DRX is supported by the UE.

In a twenty-second aspect, alone or in combination with one or more of the first through twenty-first aspects, the indication is in sidelink control information of the different sidelink communication.

In a twenty-third aspect, alone or in combination with one or more of the first through twenty-second aspects, the indication is in a MAC header field of the different sidelink communication.

In a twenty-fourth aspect, alone or in combination with one or more of the first through twenty-third aspects, the indication is in a MAC-CE of the different sidelink communication.

In a twenty-fifth aspect, alone or in combination with one or more of the first through twenty-fourth aspects, the indication is in a PDCP header field of the different sidelink communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a determination component 908, a DRX component 910, or a profile component 912, among other examples.

In some aspects, the apparatus 900 may be configured to perform one or more operations described herein in connection with FIGS. 6-7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The profile component 912 may receive a transmission profile (e.g., from an application executing on the apparatus 900). In some aspects, the transmission profile may indicate whether sidelink DRX is required. The reception component 902 may receive a sidelink communication. In some aspects, the sidelink communication may indicate whether sidelink DRX is supported. The reception component 902 and/or the transmission component 904 may communicate with one or more other UEs in accordance with a configuration for sidelink DRX, or with sidelink DRX disabled, based at least in part on the transmission profile or the sidelink communication.

The reception component 902 may receive the configuration for sidelink DRX.

The determination component 908 may determine whether to disable sidelink DRX based at least in part on the transmission profile or the sidelink communication.

The DRX component 910 may operate in an active state during an inactive time period for sidelink DRX to receive the sidelink communication.

The transmission component 904 may retransmit the sidelink communication during an active time period for sidelink DRX if the sidelink communication is received during an inactive time period for sidelink DRX.

The transmission component 904 may transmit negative acknowledgment feedback for the sidelink communication, regardless of a reception status of the sidelink communication at the UE, if the sidelink communication is received during an inactive time period for sidelink DRX.

The transmission component 904 may transmit a different sidelink communication that does not include an indication that sidelink DRX is supported by the UE if the sidelink communication is received during an inactive time period for sidelink DRX.

The transmission component 904 may transmit a different sidelink communication that includes an indication of a non-supporting UE for sidelink DRX if the sidelink communication is received during an inactive time period for sidelink DRX.

The transmission component 904 may transmit a different sidelink communication that includes an indication that sidelink DRX is supported by the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a transmission profile, of an application executing on the UE, that indicates whether sidelink discontinuous reception (DRX) is required, or a sidelink communication that indicates whether sidelink DRX is supported; and communicating with one or more other UEs in accordance with a configuration for sidelink DRX, or with sidelink DRX disabled, based at least in part on the transmission profile or the sidelink communication.

Aspect 2: The method of Aspect 1, further comprising: receiving the configuration for sidelink DRX.

Aspect 3: The method of any of Aspects 1-2, further comprising: determining whether to disable sidelink DRX based at least in part on the transmission profile or the sidelink communication.

Aspect 4: The method of any of Aspects 1-3, wherein communicating with the one or more other UEs is in connection with a service type, and wherein the transmission profile is associated with the service type and includes an indication of whether sidelink DRX is required.

Aspect 5: The method of Aspect 4, wherein communicating with the one or more other UEs is in accordance with the configuration for sidelink DRX if the indication indicates that sidelink DRX is required.

Aspect 6: The method of Aspect 4, wherein communicating with the one or more other UEs is with sidelink DRX disabled if the indication does not indicate that sidelink DRX is required.

Aspect 7: The method of any of Aspects 1-3, wherein the sidelink communication is received from a different UE and indicates that sidelink DRX is not supported by the different UE if the sidelink communication does not include an indication that sidelink DRX is supported by the different UE.

Aspect 8: The method of Aspect 7, wherein communicating with the one or more other UEs is with sidelink DRX disabled based at least in part on the sidelink communication not including the indication that sidelink DRX is supported by the different UE.

Aspect 9: The method of any of Aspects 7-8, wherein the sidelink communication is received during an active time period for sidelink DRX.

Aspect 10: The method of any of Aspects 7-8, wherein the sidelink communication is received during an inactive time period for sidelink DRX.

Aspect 11: The method of any of Aspects 7-10, further comprising: operating in an active state during an inactive time period for sidelink DRX to receive the sidelink communication.

Aspect 12: The method of Aspect 11, wherein the UE is randomly identified, from a plurality of UEs, to operate in the active state during the inactive time period for sidelink DRX.

Aspect 13: The method of any of Aspects 11-12, wherein operating in the active state during the inactive time period for sidelink DRX is based at least in part on a quantity of different UEs, that do not support sidelink DRX, that have been identified by the UE.

Aspect 14: The method of Aspect 11, wherein operating in the active state during the inactive time period for sidelink DRX is based at least in part on a quantity of different UEs, that do not support sidelink DRX, in a managed group of UEs that includes the UE.

Aspect 15: The method of any of Aspects 7-14, further comprising: retransmitting the sidelink communication during an active time period for sidelink DRX if the sidelink communication is received during an inactive time period for sidelink DRX.

Aspect 16: The method of any of Aspects 7-15, further comprising: transmitting negative acknowledgment feedback for the sidelink communication, regardless of a reception status of the sidelink communication at the UE, if the sidelink communication is received during an inactive time period for sidelink DRX.

Aspect 17: The method of any of Aspects 7-16, further comprising: transmitting a different sidelink communication that does not include an indication that sidelink DRX is supported by the UE if the sidelink communication is received during an inactive time period for sidelink DRX.

Aspect 18: The method of any of Aspects 7-17, further comprising: transmitting a different sidelink communication that includes an indication of a non-supporting UE for sidelink DRX if the sidelink communication is received during an inactive time period for sidelink DRX.

Aspect 19: The method of Aspect 1, wherein the sidelink communication includes an explicit indication of a non-supporting UE for sidelink DRX, or the sidelink communication does not include an indication that sidelink DRX is supported as an implicit indication of the non-supporting UE for sidelink DRX.

Aspect 20: The method of Aspect 19, wherein communicating with the one or more other UEs is with sidelink DRX disabled based at least in part on the explicit indication or the implicit indication of the non-supporting UE for sidelink DRX.

Aspect 21: The method of any of Aspects 1-3, wherein the sidelink communication is received from a different UE and indicates that sidelink DRX is supported by the different UE if the sidelink communication includes an indication that sidelink DRX is supported by the different UE.

Aspect 22: The method of Aspect 1, further comprising: transmitting a different sidelink communication that includes an indication that sidelink DRX is supported by the UE.

Aspect 23: The method of Aspect 22, wherein the indication is in sidelink control information of the different sidelink communication.

Aspect 24: The method of Aspect 22, wherein the indication is in a medium access control (MAC) header field of the different sidelink communication.

Aspect 25: The method of Aspect 22, wherein the indication is in a medium access control (MAC) control element of the different sidelink communication.

Aspect 26: The method of Aspect 22, wherein the indication is in a packet data convergence protocol (PDCP) header field of the different sidelink communication.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive
      a sidelink communication that indicates whether sidelink discontinuous reception (DRX) is supported, wherein the sidelink communication is to be received from a different UE, and the sidelink communication indicates that sidelink DRX is not supported by the different UE if the sidelink communication does not include an indication that sidelink DRX is supported by the different UE, wherein the sidelink DRX comprises a sidelink DRX cycle that includes an active time period and an inactive time period; and
      communicate with one or more other UEs in accordance with a configuration for sidelink DRX, or with sidelink DRX disabled, based at least in part on the sidelink communication.

2. The apparatus of claim 1, wherein the one or more processors, to communicate with the one or more other UEs, are configured to communicate with the one or more other UEs in connection with a service type, and
   wherein a transmission profile associated with an application that is to execute on the UE is associated with the service type and includes an indication of whether sidelink DRX is required.

3. The apparatus of claim 2, wherein the one or more processors, to communicate with the one or more other UEs, are configured to communicate with the one or more other UEs in accordance with the configuration for sidelink DRX if the indication indicates that sidelink DRX is required.

4. The apparatus of claim 2, wherein the one or more processors, to communicate with the one or more other UEs, are configured to communicate with the one or more other UEs with sidelink DRX disabled if the indication does not indicate that sidelink DRX is required.

5. The apparatus of claim 2, wherein the apparatus is configured with a mapping of service types to transmission profiles, and wherein the one or more processors are further configured to:
   determine an association between the service type and the transmission profile associated with the application based at least in part on the mapping.

6. The apparatus of claim 1, wherein the one or more processors, to communicate with the one or more other UEs, are configured to communicate with the one or more other UEs with sidelink DRX disabled based at least in part on the sidelink communication not including the indication that sidelink DRX is supported by the different UE.

7. The apparatus of claim 1, wherein the one or more processors are further configured to:
   operate in an active state during the inactive time period for sidelink DRX to receive the sidelink communication.

8. The apparatus of claim 1, wherein the one or more processors are further configured to:
   retransmit the sidelink communication during the active time period for sidelink DRX if the sidelink communication is received during the inactive time period for sidelink DRX.

9. The apparatus of claim 1, wherein the one or more processors are further configured to:

transmit negative acknowledgment feedback for the sidelink communication, regardless of a reception status of the sidelink communication at the UE, if the sidelink communication is received during the inactive time period for sidelink DRX.

10. The apparatus of claim 1, wherein the one or more processors are further configured to:
transmit a different sidelink communication that does not include an indication that sidelink DRX is supported by the UE if the sidelink communication is received during the inactive time period for sidelink DRX.

11. The apparatus of claim 1, wherein the one or more processors are further configured to:
transmit a different sidelink communication that includes an indication of a non-supporting UE for sidelink DRX if the sidelink communication is received during the inactive time period for sidelink DRX.

12. The apparatus of claim 1, wherein the sidelink communication includes an explicit indication of a non-supporting UE for sidelink DRX, or the sidelink communication does not include an indication that sidelink DRX is supported as an implicit indication of the non-supporting UE for sidelink DRX.

13. The apparatus of claim 12, wherein the one or more processors, to communicate with the one or more other UEs, are configured to communicate with the one or more other UEs with sidelink DRX disabled based at least in part on the explicit indication or the implicit indication of the non-supporting UE for sidelink DRX.

14. The apparatus of claim 1, wherein the sidelink communication indicates that sidelink DRX is supported by the different UE if the sidelink communication includes an indication that sidelink DRX is supported by the different UE.

15. A method of wireless communication performed by an apparatus of a user equipment (UE), comprising:
receiving
a sidelink communication that indicates whether sidelink discontinuous reception (DRX) is supported, wherein the sidelink communication is to be received from a different UE, and the sidelink communication indicates that sidelink DRX is not supported by the different UE if the sidelink communication does not include an indication that sidelink DRX is supported by the different UE, wherein the sidelink DRX comprises a sidelink DRX cycle that includes an active time period and an inactive time period; and
communicating with one or more other UEs in accordance with a configuration for sidelink DRX, or with sidelink DRX disabled, based at least in part on the sidelink communication.

16. The method of claim 15, wherein communicating with the one or more other UEs is in connection with a service type, and
wherein a transmission profile associated with an application to be executed on the UE is associated with the service type and includes an indication of whether sidelink DRX is required.

17. The method of claim 16, wherein communicating with the one or more other UEs is in accordance with the configuration for sidelink DRX if the indication indicates that sidelink DRX is required.

18. The method of claim 16, wherein communicating with the one or more other UEs is with sidelink DRX disabled if the indication does not indicate that sidelink DRX is required.

19. The method of claim 16, wherein communicating with the one or more other UEs is with sidelink DRX disabled based at least in part on the sidelink communication not including the indication that sidelink DRX is supported by the different UE.

20. The method of claim 16, further comprising:
operating in an active state during the inactive time period for sidelink DRX to receive the sidelink communication.

21. The method of claim 16, further comprising:
retransmitting the sidelink communication during the active time period for sidelink DRX if the sidelink communication is received during the inactive time period for sidelink DRX.

22. The method of claim 16, further comprising:
transmitting negative acknowledgment feedback for the sidelink communication, regardless of a reception status of the sidelink communication at the UE, if the sidelink communication is received during the inactive time period for sidelink DRX.

23. The method of claim 16, further comprising:
transmitting a different sidelink communication that does not include an indication that sidelink DRX is supported by the UE if the sidelink communication is received during the inactive time period for sidelink DRX.

24. The method of claim 16, further comprising:
transmitting a different sidelink communication that includes an indication of a non-supporting UE for sidelink DRX if the sidelink communication is received during the inactive time period for sidelink DRX.

25. The method of claim 16, wherein the apparatus is configured with a mapping of service types to transmission profiles, and wherein the method further comprises:
determining an association between the service type and the transmission profile associated with the application based at least in part on the mapping.

26. The method of claim 15, wherein the sidelink communication includes an explicit indication of a non-supporting UE for sidelink DRX, or the sidelink communication does not include an indication that sidelink DRX is supported as an implicit indication of the non-supporting UE for sidelink DRX.

27. The method of claim 26, wherein communicating with the one or more other UEs is with sidelink DRX disabled based at least in part on the explicit indication or the implicit indication of the non-supporting UE for sidelink DRX.

28. The method of claim 15, wherein the sidelink communication indicates that sidelink DRX is supported by the different UE if the sidelink communication includes an indication that sidelink DRX is supported by the different UE.

29. A non-transitory computer-readable medium storing a set of instructions for wireless communication, the set of instructions comprising:
one or more instructions that, when executed by one or more processors of a user equipment (UE), cause the UE to:
receive
a sidelink communication that indicates whether sidelink discontinuous reception (DRX) is supported, wherein the sidelink communication is to be received from a different UE, and the sidelink communication indicates that sidelink DRX is not supported by the different UE if the sidelink communication does not include an indication that sidelink DRX is supported by the different UE, wherein the sidelink DRX comprises a sidelink DRX cycle that includes an active time period and an inactive time period; and communicate with one or more other UEs in accordance with a configuration for sidelink DRX, or with sidelink DRX disabled, based at least in part on the sidelink communication.

30. An apparatus for wireless communication, comprising:

means for receiving a sidelink communication that indicates whether sidelink discontinuous reception (DRX) is supported, wherein the sidelink communication is to be received from a different UE, and the sidelink communication indicates that sidelink DRX is not supported by the different UE if the sidelink communication does not include an indication that sidelink DRX is supported by the different UE, wherein the sidelink DRX comprises a sidelink DRX cycle that includes an active time period and an inactive time period; and means for communicating with one or more user equipments (UEs) in accordance with a configuration for sidelink DRX, or with sidelink DRX disabled, based at least in part on the sidelink communication.

* * * * *